(12) United States Patent
Clemens et al.

(10) Patent No.: US 7,567,262 B1
(45) Date of Patent: Jul. 28, 2009

(54) HYBRID GRAPHICS FOR INTERACTIVE REPORTING

(75) Inventors: Ian Clemens, Lansing, MI (US); Riyaz Prasla, Lansing, MI (US); Justin Hoffman, East Lansing, MI (US)

(73) Assignee: IDV Solutions LLC, Grand Ledge, MI (US)

( * ) Notice: Subject to any disclaimer, the term of this patent is extended or adjusted under 35 U.S.C. 154(b) by 486 days.

(21) Appl. No.: 11/068,442

(22) Filed: Feb. 25, 2005

(51) Int. Cl.
*G09G 5/00* (2006.01)
*G09G 5/14* (2006.01)

(52) U.S. Cl. ..................... 345/632; 345/629
(58) Field of Classification Search .................. 345/629
See application file for complete search history.

(56) References Cited

U.S. PATENT DOCUMENTS

| | | | | | |
|---|---|---|---|---|---|
| 5,379,129 | A | * | 1/1995 | Othmer et al. ............... | 358/450 |
| 5,381,338 | A | * | 1/1995 | Wysocki et al. ............. | 701/207 |
| 5,528,518 | A | * | 6/1996 | Bradshaw et al. ........... | 702/150 |
| 5,802,294 | A | * | 9/1998 | Ludwig et al. .............. | 709/204 |
| 6,012,016 | A | * | 1/2000 | Bilden et al. ................. | 702/12 |
| 6,274,290 | B1 | * | 8/2001 | Veneklasen et al. ......... | 430/296 |
| 6,343,290 | B1 | * | 1/2002 | Cossins et al. .............. | 707/10 |
| 6,401,102 | B1 | * | 6/2002 | Ishii et al. ................. | 707/104.1 |
| 6,604,126 | B2 | * | 8/2003 | Neiman et al. .............. | 709/203 |
| 6,674,445 | B1 | * | 1/2004 | Chithambaram et al. .... | 345/619 |
| 7,107,285 | B2 | * | 9/2006 | von Kaenel et al. ....... | 707/104.1 |
| 7,126,578 | B1 | * | 10/2006 | Hamburg .................. | 345/156 |
| 7,161,604 | B2 | * | 1/2007 | Higgins et al. .............. | 345/619 |
| 7,246,880 | B2 | * | 7/2007 | Ross et al. ................... | 347/43 |
| 2001/0028348 | A1 | * | 10/2001 | Higgins et al. .............. | 345/213 |
| 2002/0097416 | A1 | * | 7/2002 | Chang et al. ............... | 358/1.13 |
| 2002/0097417 | A1 | * | 7/2002 | Chang et al. ............... | 358/1.13 |
| 2002/0113797 | A1 | * | 8/2002 | Potter et al. ................. | 345/581 |
| 2003/0052896 | A1 | * | 3/2003 | Higgins et al. .............. | 345/619 |
| 2004/0075699 | A1 | * | 4/2004 | Franchi et al. .............. | 345/860 |
| 2004/0117358 | A1 | * | 6/2004 | von Kaenel et al. ......... | 707/3 |
| 2005/0063596 | A1 | * | 3/2005 | Yomdin et al. .............. | 382/232 |
| 2005/0159882 | A1 | * | 7/2005 | Howard et al. .............. | 701/200 |

(Continued)

FOREIGN PATENT DOCUMENTS

WO WO 99/21108 * 4/1999

OTHER PUBLICATIONS

Geospatial metadata querying and visualization on the WWW using JavaTM applets Alper, N.; Stein, C.; Information Visualization '96, Proceedings IEEE Symposium on Oct. 28-29, 1996 pp. 77-84, 128.*

(Continued)

*Primary Examiner*—Javid A Amini
(74) *Attorney, Agent, or Firm*—Rader, Fishman & Grauer, PLLC (57) ABSTRACT

A computer in the form of a client comprises a graphical user interface and a memory, the memory including a first data object for storing the feature data in a first format, and a second data object for storing the image data in a second format. The client computer is configured to send at least one query; receive at least one of the feature data and the image data in response to the at least one query; and display the feature data in the first format and the image data in the second format in the graphical user interface.

27 Claims, 7 Drawing Sheets

U.S. PATENT DOCUMENTS

| | | | |
|---|---|---|---|
| 2006/0001679 A1* | 1/2006 | Hamburg | 345/620 |
| 2006/0056695 A1* | 3/2006 | Wu et al. | 382/173 |
| 2006/0061595 A1* | 3/2006 | Goede et al. | 345/619 |
| 2006/0092223 A1* | 5/2006 | Ross et al. | 347/43 |
| 2006/0248349 A1* | 11/2006 | Rathjen et al. | 713/186 |
| 2007/0050340 A1* | 3/2007 | von Kaenel et al. | 707/3 |

OTHER PUBLICATIONS

IMACTS: an interactive, multiterabyte image archive Stephenson, T.; Voorhees, H.; Mass Storage Systems, 1995. 'Storage—At the Forefront of Information Infrastructures', Proceedings of the Fourteenth IEEE Symposium on Sep. 11-14, 1995 pp. 146-161.*

Byong Mok Oh, Max Chen, Julie Dorsey, Frédo Durand; Image-based modeling and photo editing, Aug. 2001, ACM.*

Alia, T.; Miettinen, V , dPVS: and occlusion culling system for massive dynamic environments.; Computer Graphics and Applications, IEEE vol. 24, Issue 2, Mar.-Apr. 2004 pp. 86-97.*

Environmental Systems Research Institute, Inc. (ESRI) "Power Your Business With ESRI GIS"; Oct. 1999; 22 pages.

Microsoft MapPoint Web Service Version 3.5; "Reviewers Guide"; Feb. 2004; 34 pages.

Microsoft MapPoint Web Service; "Fact Sheet"; Nov. 2003; 4 pages.

Microsoft, PressPass—Information for Journalists; "Microsoft Offers Broader, Deeper Market Insight With Availability Of MapPoint 2004 Business Mapping Software"; http://www.microsoft.com/presspass/press/2003/sep03/09-18MapPoint2004PR.asp; Feb. 15, 2005; 3 pages.

Microsoft MapPoint 2004, "Frequently Asked Questions," Aug. 2003; 13 pages.

Microsoft MapPoint 2004; "Fact Sheet," Aug. 2003, 7 pages.

Microsoft MapPoint 2004, "Feature Guide 2003"; 11 pages.

Unit 21—The Raster/Vector Database Debate; http://www.geog.ubc.ca/courses/klink/gis.notes/ncgia/u21.html; Aug. 30, 1997; 8 pages.

Microsoft MapPoint Web Service, "FAQ for MapPoint Web Service Version 3.5," Dec. 2003; 5 pages.

* cited by examiner

```
<svg xmlns:xlink="http://www.w3.org/1999/xlink">
    <g id="suppliers">
        <use xlink:href="#type_4" id="suppliers_12009476"
        x="116" y="216">
            <metadata>
                <point latitude="22.4556" longitude="88.2595"
                id="12009476" name="HINDUSTAN MOTORS LIMITED"
                city="UTTARPARA" type="4" />
            </metadata>
        </use>
        <use xlink:href="#type_5" id="suppliers_61000835"
        x="-47" y="177">
            <metadata>
                <point latitude="17" longitude="48.5" id="61000835"
                name="AUDI AG GYOR PLANT" city="GYOR" type="5" />
            </metadata>
        </use>
    </g>
</svg>
```

(224 encompasses the whole block; 225 marks each `<use>...</use>` element.)

Fig. 5

```
<?xml version="1.0" ?>
<style>
<source featureType="point" name="suppliers">
<theme name="normal" key="type" symbolGroup="Points">
<value equals="0" label="Type 0" style="type_0" />
<value equals="1" label="Type 1" style="type_1" />
<value equals="2" label="Type 2" style="type_2" />
<value equals="3" label="Type 3" style="type_3" />
<value equals="4" label="Type 4" style="type_4" />
<value equals="5" label="Type 5" style="type_5" />
<value equals="6" label="Type 6" style="type_6" />
<value equals="7" label="Type 7" style="type_7" />
<value equals="8" label="Type 8" style="type_8" />
<value equals="9" label="Type 9" style="type_9" />
<value equals="none" label="Multiple Locations" style="cluster" />
</theme>
</source>
<source featureType="polygon" name="regions">
<theme name="normal" key="sales" symbolGroup="Regions">
<range label="more than $83.33 M" low="83.33" style="08306B" />
<range label="$66.67 - 83.33 M" low="66.67" high="83.33" style="08519C" />
<range label="$50.00 - 66.67 M" low="50.00" high="66.67" style="2171B5" />
<range label="$33.33 - 50.00 M" low="33.33" high="50.00" style="4292C6" />
<range label="$16.67 - 25 M" low="16.67" high="33.33" style="6BAED6" />
<range label="less than $16.67 M" high="16.67" style="9ECAE1" />
</theme>
</source>
</style>
```

Fig. 6A

```xml
<?xml version="1.0" encoding="utf-8" ?>
<?-- EFS Application configuration -->
<APPLICATION appname="car dealership application" path="">
    <DATASOURCE>
        <GEOGRAPHIC>
            <DATASET dsname="MapPoint" username="mappointuser" password="123" >
                <WSDLURL>https://service.mappoint.net/secure-30/mappoint.wsdl</WSDLURL>
                <STYLE> Political </STYLE>
                <DEFAULTSOURCE> MapPoint.NA </DEFAULTSOURCE>
                <OVERVIEWSOURCE> MapPoint.World </OVERVIEWSOURCE>
                <DATAEXTENT> NA </DATAEXTENT>
            </DATASET>
            <DATASET dsname="RouteMap" username="Routemapuser" password="123" >
                <MAPSERVER> http://localhost/scripts/webgate.dll</MAPSERVER>
                <MAPGROUP> routemap</MAPGROUP>
                <PROXYNAMES host="http://proxyhost.com" port="30" > </PROXYNAMES>
                <UNITS> mi|km|px </UNITS>
                <LOCALE>US</LOCALE>
                <LANGUAGE>EN</LANGUAGE>
                <CHARSET></CHARSET>
                <SCALELEGENDVISIBILITY>true</SCALELEGENDVISIBILITY>
            </DATASET>
        </GEOGRAPHIC>
        <BUSINESS>
            <DATASET dsname="BusinessDB" server="1.2.3.4" username="mssqluser" password="123" >
                <TABLE tname="clients">
                    <XFIELD xfldname="x" type="string" > </XFIELD>
                    <YFIELD yfldname="y" type="string" > </YFIELD>
                    <ZFIELD zfldname="z" type="string" > </ZFIELD>
                    <FIELD fldname="id" type="string" > </FIELD>
                    <FIELD fldname="lastname" type="string" > </FIELD>
                </TABLE>
                <TABLE tname="employees"> </TABLE>
            </DATASET>
            <DATASET dsname="BusinessDB2" server="4.6.3.114" username="oracleuser" password="123" >
                <TABLE tname="households"> </TABLE>
                <TABLE tname="employees"> </TABLE>
            </DATASET>
        </BUSINESS>
    </DATASOURCE>
    <LAYERS>
        <LAYER id="1" type="point|point|polygon" dataset="BusinessDB" query="clients:id!=0" minscale="1:10000" maxscale="1:5000" symbol=""> </LAYER>
        <LAYER id="2" type="line" dataset="RouteMap" query="road" minscale="1:50000" maxscale="1:3000" symbol=""> </LAYER>
        <LAYER id="3" type="point" dataset="MapPoint" query="cities" minscale="1:20000" maxscale="1:4000" symbol=""> </LAYER>
        <LAYER id="4" type="point" dataset="BusinessDB2" query="households:size>3" minscale="1:120000" maxscale="1:3000" symbol=""> </LAYER>
    </LAYERS>
```

Fig. 6B

```
<MAPCOMPONENTS>
    <COMPONENT cname="overview"> </COMPONENT>
    <COMPONENT cname="legend"> </COMPONENT>
    <COMPONENT cname="scalevar"> </COMPONENT>
    <COMPONENT cname="logo"> </COMPONENT>
    <COMPONENT cname="northarrow"> </COMPONENT>
    <COMPONENT cname="toolbar"> </COMPONENT>
    <COMPONENT cname="info"> </COMPONENT>
</MAPCOMPONENTS>

<MAPTOOLS>
    <TOOL toolname="zoomin"> </TOOL>
    <TOOL toolname="zoomout"> </TOOL>
    <TOOL toolname="pan"> </TOOL>
    <TOOL toolname="select"> </TOOL>
    <TOOL toolname="ruler"> </TOOL>
    <TOOL toolname="identify"> </TOOL>
    <TOOL toolname="history"> </TOOL>
    <TOOL toolname="export"> </TOOL>
    <TOOL toolname="help"> </TOOL>
    <TOOL toolname="query"> </TOOL>
</MAPTOOLS>

<?-- EFS App-view configuration: initial, max, AOI / quick locations -->
<VIEW>
    <INITIAL type = "map|graphic"> </INITIAL>
    <EXTENT extname="initial", north="" east="" south="" west=""> </EXTENT>
    <EXTENT extname="max", north="" east="" south="" west=""> </EXTENT>
    <EXTENT extname="asia", north="" east="" south="" west=""> </EXTENT>
</VIEW>
<?-- EFS App-Script configuration: get map/image, feature, overview, route, and for other funtions -->
<SCRIPTS basepath="c:\appl\script" timeout="100ms" >
    <SCRIPT sname="getMap" path="http://websvr.ms.com/appl/script2" filename="getmap.aspx?usrid=@"> </SCRIPT>
    <SCRIPT sname="getFeature" path="" filename="getfeature.aspx?usrid=@"> </SCRIPT>
    <SCRIPT sname="getOverview" path="" filename="getoverview.aspx?usrid=@"> </SCRIPT>
    <SCRIPT sname="getRoute" path="" filename="getRoute.aspx?usrid=@"> </SCRIPT>
    <SCRIPT sname="getAddress" path="" filename="getAddress.aspx?usrid=@"> </SCRIPT>
    <SCRIPT sname="insertFeature" path="" filename="insertFeature.aspx?usrid=@"> </SCRIPT>
</SCRIPTS>
<CLUSTER radius="1km"> </CLUSTER>
<OUTPUT>
    <MAP format="JPEG|PNG|BMP|GIF"> </MAP>
    <FEATURE format="SVG|TXT"></FEATURE>
</OUTPUT>
<SCALE maxzoomcounts="10" zoomfactor="3">
    <OVERVIEW minscale="1:10000" maxscale="1:5000"> </OVERVIEW>
    <LEGEND minscale="1:10000" maxscale="1:5000"> </LEGEND>
</SCALE>
<HELP type="WinHelp|HTML|XML" path="http://websvr.ms.com/appl/help"> </HELP>
</APPLICATION>
```

Fig. 7

HYBRID GRAPHICS FOR INTERACTIVE REPORTING

FIELD

The present application relates to graphical reporting of data.

BACKGROUND

Raster images, or bitmaps, are well known, and have long been used for the display of computer graphics. A bitmap is a pixel-by-pixel map of how an image should be rendered on a computer or video display or printout, defining the location, color, intensity, etc. of each pixel. Although numerous schemes for compressing bitmaps have been employed, including the JPEG (Joint Photographic Experts Group), GIF (Graphics Interchange Format), and PNG (Portable Network Graphics) standards, in general raster images suffer from the shortcoming that it is impractical to encode raster images with large amounts of information regarding the data attributes of raster image data. Thus, raster images are usually static and do not provide interactive functionality such as allowing a user to click on a certain point in an image to change how the image is displayed, or to obtain more information about a point or points in the image. However, raster images have certain advantages, including the facts that they are simply organized, easy for programmers to understand, and generally efficient for microprocessors to handle.

Vector graphics are similarly well known, and have long been used to pictorially present image data on computer systems. A vector graphic is essentially a set of instructions for drawing geometric shapes that are used to represent images on a computer or video display or printout. Where a bitmap file includes a bit or, more likely, a set of bits, describing each pixel to be included in an image, a vector graphic file is simply a list of geometric shapes along with attributes indicating how the shape is to be rendered. For example, a vector graphic file might list a rectangle, the attributes of which would include dimensions (length and width), color, fill pattern, location, orientation, etc. As with bitmaps, different standards for vector graphics files exist. One such standard is the SVG (Scalable Vector Graphics) Specification 1.1. (W3C Recommendation 14 Jan. 2003), promulgated by the World Wide Web Consortium of Cambridge, Mass., fully incorporated herein in its entirety by reference. Vector graphics files have the advantages of consuming smaller amounts of memory than bitmap files, and often can render images with greater precision, particularly at higher resolutions. However, vector graphics files sometimes consume large amounts of processing overhead to render certain images, such as images containing many complex polygons.

Accordingly, raster images are advantageous for presentation of complex static images where data is unlikely to need refreshing. Vector graphics, on the other hand, are desirable in situations requiring numerous attributes to be associated with image data, and in which flexibility in the display of an image is required. It would be desirable to be able to obtain the advantages of raster images and vector graphics, while minimizing the disadvantages of each kind of format.

Graphics data, whether rendered according to a bitmap or a vector graphics file, is very useful in many reporting applications. In most, if not all, applications users find it extremely useful to obtain a visual representation of data apart from words and numbers in a table. Thus, applications that query relational databases, computer spreadsheets, and even the World Wide Web, often represent data in some sort of graphical format in addition to, or in lieu of, presenting data in a strictly alpha-numeric format. To take a common example, relational databases known as data warehouses are designed specifically to support efficient construction of reports. Such databases are also often referred to as OLAP (On-line Analytical Processing) databases, indicating that they are designed to support analysis and review of information in the aggregate, as opposed to conventional OLTP (On-line Transactional Processing) databases, which are designed to support efficient storage and retrieval of information about individual events, e.g., transactions. OLAP databases are often constructed as part of DSS (decision support system) applications, also sometimes known as business intelligence applications. DSS applications are designed to allow users to quickly navigate through data by viewing data at different levels of aggregation. Such navigation is known as "drilling."

One way to navigate through OLAP data is by viewing the data aggregated by different quantities of time; the data stored in OLAP databases almost always has a time attribute. To take a common example, most businesses aggregate sales transactions to report sales figures on a monthly level. Monthly sales figures are generally aggregated on a quarterly basis, and quarterly figures are generally aggregated on an annual basis. Thus, a user viewing a report showing sales figures on an annual basis might wish to obtain a more detailed view of sales trends, and therefore might do what is called "drill down" from the annual level to the quarterly level.

Besides time, another attribute that is very commonly associated with data in OLAP databases is location. In fact, roughly eighty percent of the data presently contained in OLAP databases has a geographical component. For example, a national retail organization may aggregate its data according to different geographic areas, e.g., telephone codes, postal codes, city, state, province, county, region, etc. Thus, a user viewing sales data aggregated at the national level may be provided with the ability to drill down to view data aggregated according to region, state, city, zip code, etc.

Another common feature of DSS applications is to provide charts and graphs representing reported data. Such functionality has been known almost since the inception of graphical user interfaces (GUIs). Certain data lends itself to particular graphical representations. For example, an executive looking at sales figures aggregated according to month may be interested in sales trends, and therefore presenting the data in a line graph format may be appropriate. Similarly, the same executive looking at sales figures aggregated according to region is likely interested in being able to easily discern which regions are the best and worst performers. The executive is likely also interested in being able to drill down into different regions, to determine how cities or states within each region are contributing to the region's overall performance—i.e., what areas have performance problems and/or what areas are responsible for good performance. Accordingly, it is known to display report data in the context of map images to facilitate geography-based analysis of that data.

Unfortunately, the components for displaying graphics, such as mapping components, suffer from a number of shortcomings in present reporting applications. Generally, such components are proprietary, meaning that they are designed to retrieve and render data that has been stored in the proprietary database of a particular software vendor. Accordingly, one such shortcoming stems from the fact that, in order to support image-based reporting, present applications require data to be added to a database that supports the specific imaging component, such as a mapping component, used by the reporting application. Similarly, statistical reporting applications require that data to be reported graphically must be stored in a proprietary application format. Accordingly, current reporting databases must undergo expensive and time-consuming customizations in order to support image-based reporting, and do not have the flexibility to be used with different, or non-proprietary, image servers or image databases.

Further, because present reporting applications display report data and image data based on the same data source, known reporting applications generally require that, when either report or image data is updated or refreshed, that both be updated or refreshed. Accordingly, present reporting applications limit the ability of users to view refreshed data. Moreover, when users of present reporting applications are able to view refreshed data, this functionality is inefficiently achieved with unnecessary processing overhead.

For example, the user of an OLAP reporting application might request a report showing an organization's total sales by state, the report to be presented as a map image. Present applications would formulate a single query to be sent to the OLAP server, which would in turn retrieve the requested report data from the OLAP database. Presently, it is a requirement for the OLAP database and/or OLAP server to provide both the report data (e.g., sales figures) and image data (e.g., map image) to be presented to the user. Once the aforementioned data is obtained, the OLAP server combines it into a single data structure. This data structure is then downloaded to the client, which uses it to present the requested report, as a map image, to the user. Disadvantageously, if the user wishes to have the report data refreshed, or wishes to make any change to the parameters of the report (e.g., show expense figures rather than sales figures, or focus on a different portion of a map), it is necessary to generate a new query, and carry out the process described above to create a new data structure incorporating both report data and image data for download to, and display by, the client.

Accordingly, it would be desirable to be able to create a reporting application in which existing, unrelated databases of both image and report data could be used together. It would further be desirable if image and report data from different databases could be displayed together, and refreshed independently of one another. Achieving such goals would enable the creation of flexible, efficient, highly functional reporting applications that have heretofore not been possible.

BRIEF SUMMARY

A computer in the form of a client comprises a graphical user interface and a memory, the memory including a first data object for storing the feature data in a first format, and a second data object for storing the image data in a second format. The client computer is configured to send at least one query; receive at least one of the feature data and the image data in response to the at least one query; and display the feature data in the first format and the image data in the second format in the graphical user interface.

DESCRIPTION OF THE DRAWINGS

FIG. 4 shows an SVG file including a feature set and feature descriptions, according to an embodiment.

FIG. 5 shows a snippet from a file called styles.xml that is stored on a feature server, according to an embodiment.

FIGS. 6A and 6B show a snippet from a file called application.xml that is stored on a feature server, according to an embodiment.

DETAILED DESCRIPTION

Introduction

The novel approach to combining report data and image data disclosed herein may be used in any reporting application in which an image can be mapped according to a multi-dimensional, often two-dimensional (e.g., XY), coordinate system. Because report data and image data are brought back separately to a reporting client, and are never combined into a single data structure or any other programmatic object, it is advantageously possible to flexibly and efficiently query, manipulate, and refresh report data and image data independently of each other, even as they are displayed overlaid together in a graphical user interface.

Figure 1:
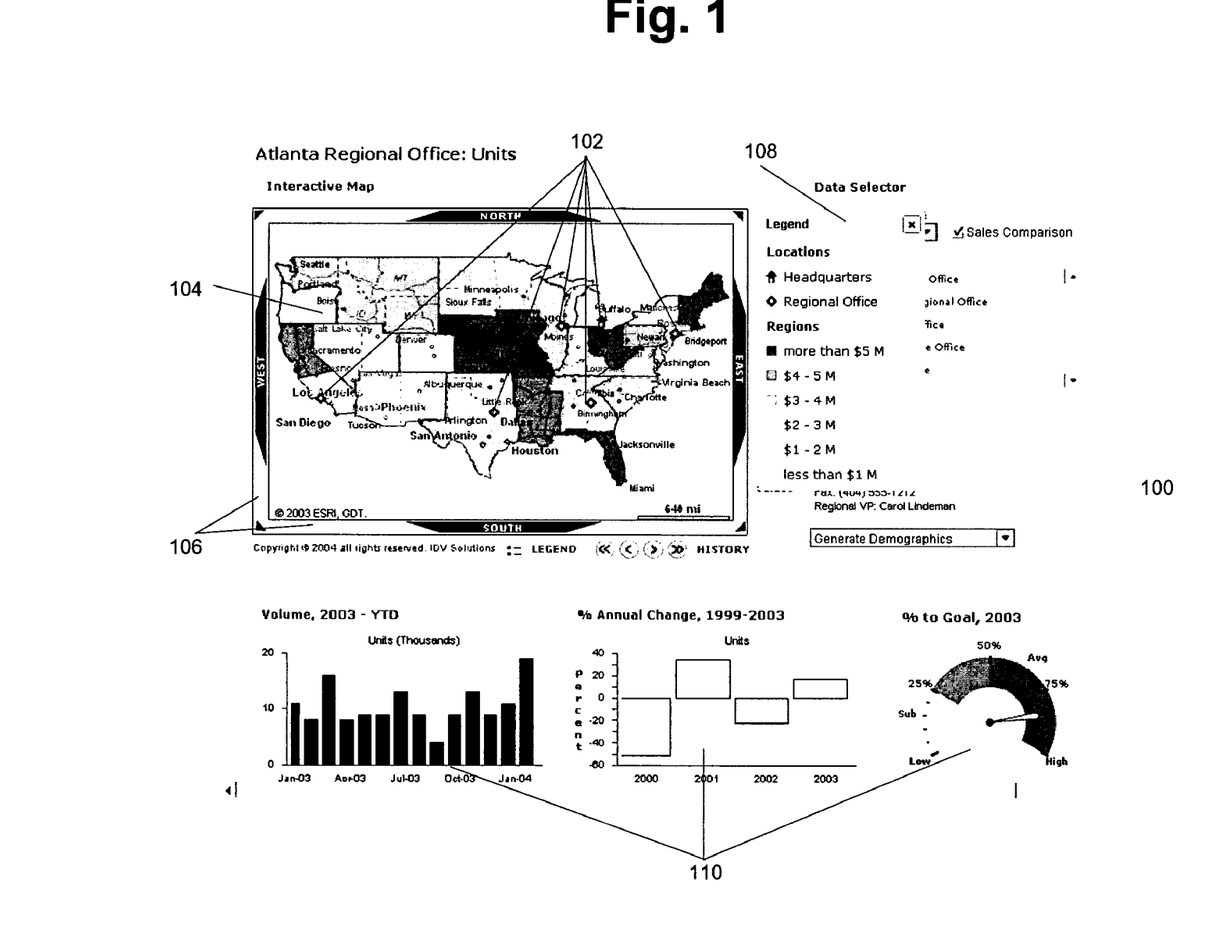
FIG. 1 shows a report display, according to an embodiment.

For example, FIG. 1 shows a report display 100, according to one embodiment. Report display 100 includes features 102 overlaid on an image 104, defined by a bounding box 106, in a graphical user interface. That is, bounding box 106 provides a common frame of reference for the display of features 102 and image 104. As explained in more detail below, features 102 and image 104 are associated with report data requested by a user. Features 102 are generally included in a vector graphics file, and include vector data to draw a geometric object such as a point, a line, or a polygon at a particular location, and may further include an event model, style rules, and/or data attributes associated with the geometric shape. Image 104 is generally a raster image. Thus, by including features 102 and image 104, report display 100 comprises a hybrid graphics display that offers rich a presentation and functionality for interactive reporting.

Features 102 are represented in report display 100 as icons that provide information about the type of feature 102 being represented (e.g., headquarters, regional office, etc.). Further, as reflected in legend 108 showing value ranges for report data, different regions of image 104 are shaded differently according to style rules included in each feature 102 that reflect particular report values, i.e., data attributes of each feature 102, associated with each region. This shading is advantageously accomplished by features 102 overlaid on regions of image 104. In other words, a region of image 104 may be shaded according to the sales number associated with that region, i.e., a style rule may specify a color or a degree of shading for the points covered by a feature 102 according to the values of a data attribute or attributes of the feature 102.

Also, different sub-reports 110 may be included within report display 100, the sub-reports 110 and their content possibly being dependent on a user selection with respect to a feature 102 as explained in more detail below. Moreover, if a user chooses to select a different image 104, e.g., by panning or zooming (zooming controls not shown in FIG. 1) the map represented by image 104, it is advantageously possible to refresh the image 104 without refreshing any of the report data associated with features 102.

Various kind of functionality may be provided with respect to features 102 according to an event model that may be included in each feature 102. For example, a pop-up balloon or tool-tip, known to those skilled in the art, may appear when a user moves a pointing device over a feature 102. Similarly, when a user clicks on a feature 102, report display 100 could be programmed to display predetermined sub-reports 110 related to the feature 102. For example, if a feature 102 represented the regional headquarters of a national chain of retail stores, clicking on that feature 102 could cause report display 100 to present reports showing sales data for the region represented by the feature 102.

The following description, including the accompanying figures, will provide further detail regarding the creation and operation of applications such as the one shown in FIG. 1.

Exemplary System Overview

Figure 2:
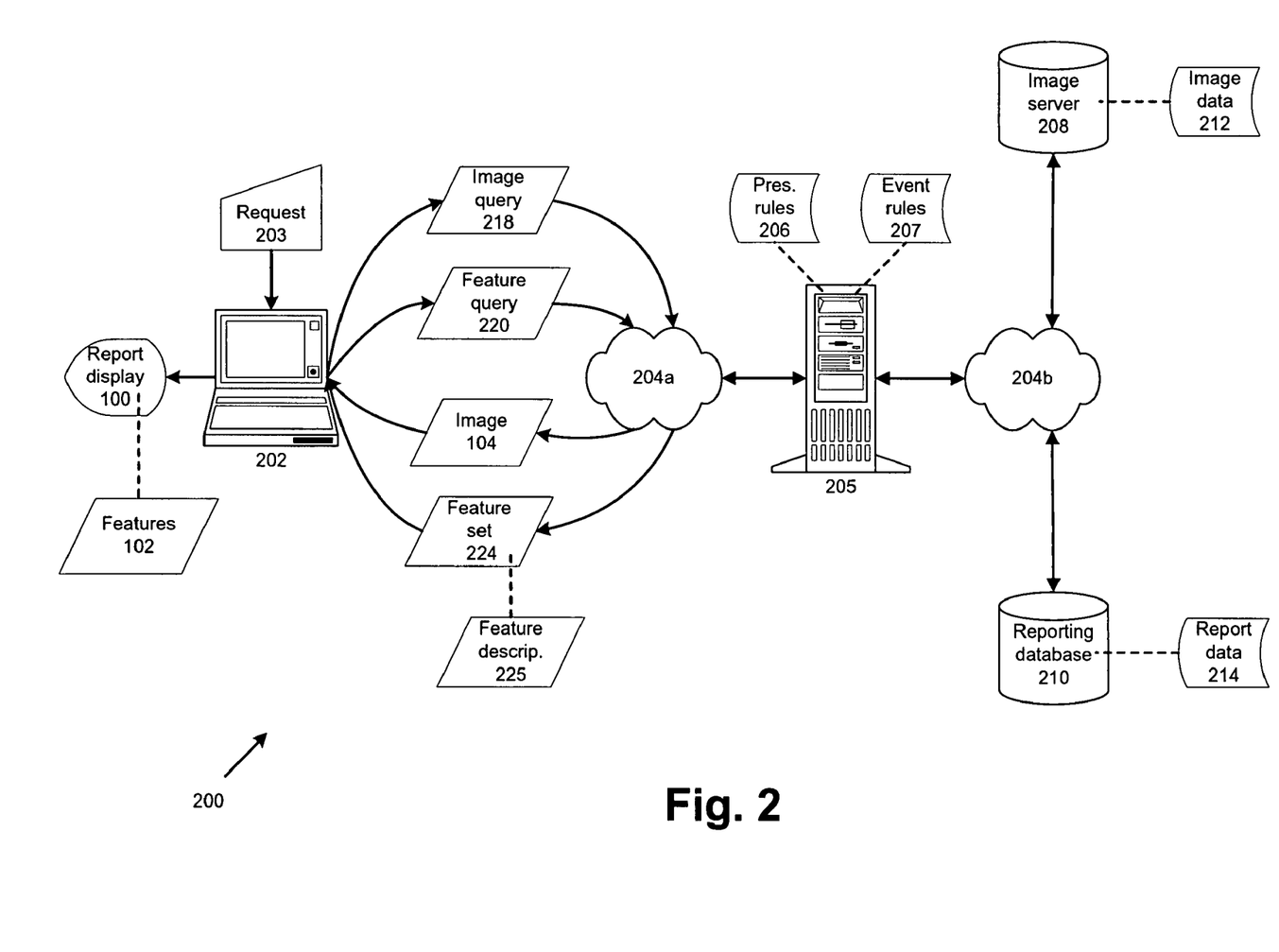
FIG. 2 is a block diagram of a reporting system, according to an embodiment.

FIG. 2 is a block diagram of a reporting system 200, according to an embodiment. Client 202 communicates via a network 204*a* with feature server 205. Feature server 205 in turn communicates via a network 204*b* with image server 208 and reporting database 210. Messages sent via networks 204*a* and 204*b* include information requests 203, image query 218, feature query 220, image results 222, and feature set 224, all of which are described in detail below.

Although client 202, feature server 205, image server 208, and reporting database 210 are shown in FIG. 1 and described herein as separate physical computing devices, it should be understood that one or more of these components may exist on the same physical computing device as one or more of the other components shown in FIG. 1. In such cases, some or all of the communications described as occurring over a network 204 may not occur or may be limited to a single computing device without use of the network 204.

Client 202 is a computer. For example, client 202 may be a desktop, laptop, or notebook computer. In some embodiments client 202 may be a mobile or portable computing device such as a cellular telephone, a personal digital assistant, or other kind of handheld computer. In general, client 202 may be any kind of computer that includes a microprocessor and one or more input devices for accepting user inputs. In most embodiments, client 202 is further capable of accessing a network 204. Client 202 also includes a display device for displaying output to a user such as report display 100.

In addition to the afore-mentioned hardware, client 202 further generally includes any operating system and application software that will enable the execution of the processes described below. Application software included on client 202 may include known software applications such as web browsers. In one embodiment, client 202 includes the Flash™ player from Macromedia, Inc. of San Francisco, Calif. Client 202 may alternatively or additionally include program code written in a variety of programming languages or employing a variety of technologies, including the C++, C#, Java™, JavaScript, Visual Basic, and/or VBScript programming languages, all of which are known to those skilled in the art, or other programming languages known to those skilled in the art.

Network 204 may be any kind of computer or telecommunications network known to those skilled in the art capable of transmitting data such as a local area network (LAN), wide area network (WAN), and/or the Internet. Networks 204*a* and 204*b*, as shown in FIG. 2 may be different kinds of network 204. For example, in one embodiment, network 204*a* is a LAN, and network 204*b* is the Internet. Other embodiments may use only one or more than two networks 204. Network 204 is generally used to transmit data according to known methods and protocols such as hyper-text transfer protocol (HTTP).

Feature server 205 is any kind of computer including a processor and a memory that is capable of executing processes as described below. Further, feature server 205 generally includes any operating system and application software that will enable the execution of processes described below. In one embodiment, application software for executing the processes described herein is written in the C# programming language, known to those skilled in the art and available from Microsoft Corp. of Redmond, Wash. However, other object oriented programming languages known to those skilled in the art, such as Java, could be used to implement the processes described herein with respect to feature server 205.

Feature server 205 generally stores presentation rules 206 and event rules 207. As described in more detail below regarding FIG. 5, presentation rules 206 are used to control the styles and other presentation parameters of various features in feature set 224. Similarly, as described in more detail below regarding FIG. 6, event rules 207 are used to determine the programming events that are associated with various features 102 described in feature set 224.

Image server 208 provides image data 212 in bitmap format. For example, image data 212 may include images of geographic maps, images of physical structures such as buildings and athletic fields, charts, graphs, and/or any images representing phenomena in a coordinate system. As described in detail below, feature server 205 receives image data 212 from image server 208 and in turn provides such image data 212 to client 202 as image 104. In some embodiments, image server 208 is provided by an application service provider such as the Mappoint Web Service provided by Microsoft Corp. of Redmond, Wash., Globeexplorer.com provided by GlobeExplorer, LLC of Walnut Creek, Calif., etc. In some embodiments, image server 208 is a database of image data 212.

Reporting database 210 includes report data 214 stored in any format capable supporting the storage and retrieval of alpha-numeric data, such as a relational format. Report data 214 may include business data such as sales information, demographic data, and/or any statistical data such as data about physical phenomena, sporting events, finance, etc. As described in detail below, feature server 205 receives report data 214 from Image server 208 and in turn provides such report data 214 to client 202 as attributes to features 102 described by feature descriptions 225 within feature set 224.

In general, image server 208 and reporting database 210 each may be a relational database, a file system, the World Wide Web, or any other data store known to those skilled in the art.

Feature set 224 generally contains a list of feature descriptions 225 describing features 102 to be overlaid at points on image 104 within a report display 100 on client 202. Feature set 224 may be provided in a variety of formats, for example, an XML file. For example, in one embodiment, as shown in FIG. 4, feature set 224 comprises an SVG file including feature descriptions 225 provided in XML format according to the SVG specification referenced above. For each feature 102 described in the feature set 224, a feature description 225 identifies the point or points on image 104 where each feature is to be overlaid, and further generally includes, for each listed feature, an identifier uniquely identifying the feature, display styles associated with the feature (e.g., colors, shapes, etc.), events associated with the feature (e.g., show a balloon with certain text when a mouse hovers over the feature), and feature attributes. Feature attributes may include report data 214 associated with a feature, or a hyper-link to such data 214.

Exemplary Process Flows

Figure 3:
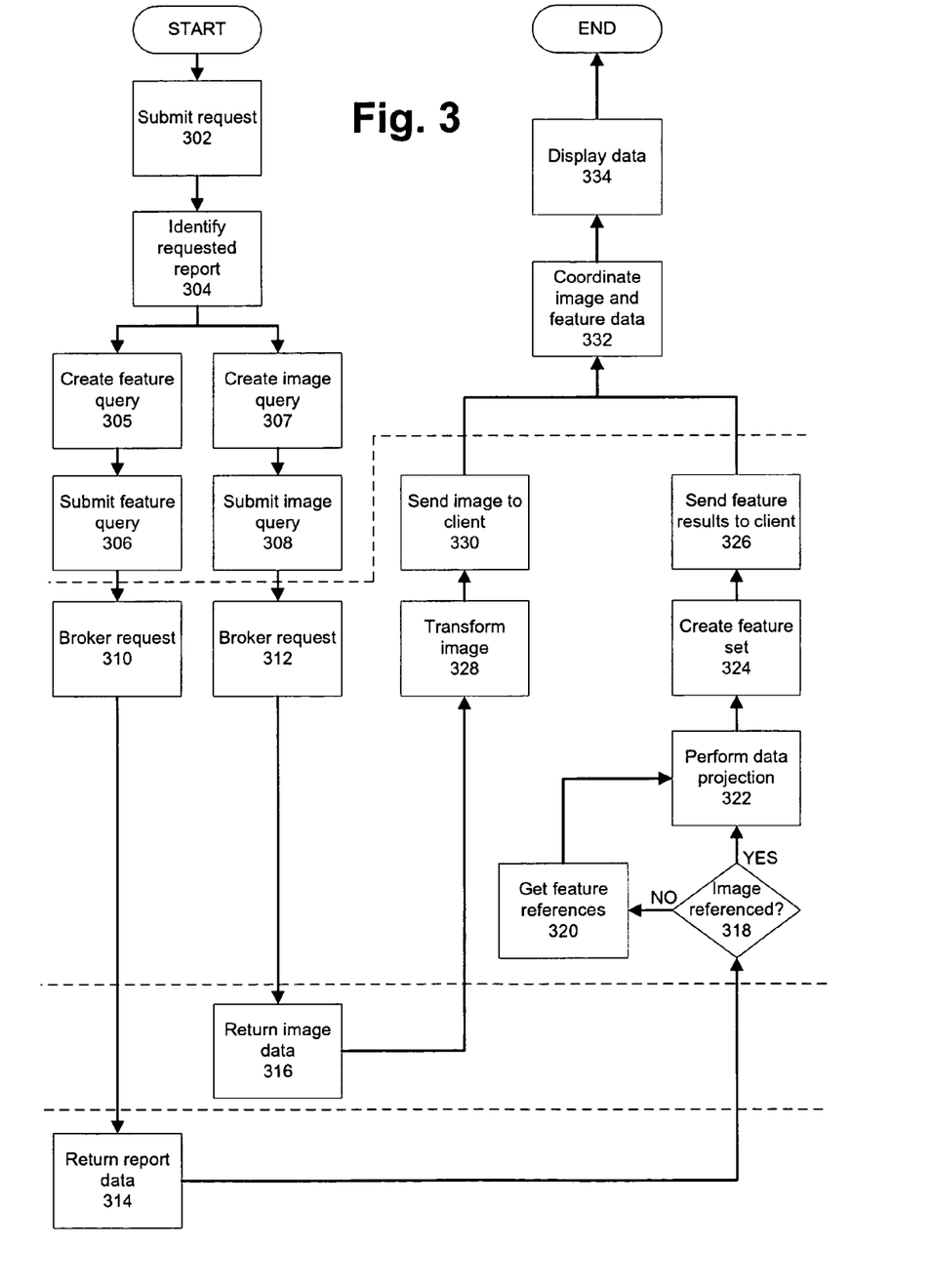
FIG. 3 depicts a process flow for retrieving and presenting feature data and an image in a report display, according to an embodiment.

FIG. 3 depicts a process flow for retrieving and presenting features 102 and image 104 in report display 100, according to an embodiment.

In step 302, client 202 submits a request 203, for report data 214, to feature server 205 via network 204. Request 203 may be submitted according to a number of mechanisms known to those skilled in the art. Generally, request 203 will be submitted via a form in a graphical user interface (GUI) such as is known to those skilled in the art. For example, a user may select criteria for requesting information by using drop down list boxes, text boxes, radio buttons, check boxes, or any other GUI form elements known to those skilled in the art. Additionally or alternatively, requests 203 may be predefined, and submitted according to hyper-links or other such means known to those skilled in the art. For example, in the business intelligence context, it is known to provide what is referred to as a "dashboard" of reports, essentially a set of links that, when a link is selected, submits a predefined request 203 for a particular report display 100. Following step 302, control proceeds to step 304.

In step 304, client 202 parses the request 203 to identify the parameters of the report display 100 that the user would like to view. In some embodiments, request 203 may be parsed by feature server 205. The precise location of the parsing functionality is not critical so long as request 203 can be parsed into image query 218 and feature query 220.

It should be understood that different applications will have different query parameters that are used to define the reports that are available to users. For example, a business intelligence application might define reports according to business measures that can be reported (e.g., "Total Sales," "Net Profit," "Gross Profit," "Expenses," etc.), along with attributes according to which such business measures should be reported, time and geography being the most common such attributes. For example, assume that, in step 302, the user selected "Sales", "Michigan", "Begin date=2003", "End Date=2004", and "Reporting Interval=quarterly" from a form presented on a display of client 202. In other words, the user has requested to view sales data for all business locations (e.g., retail outlets) in the state of Michigan for the calendar years 2003 and 2004, broken down by quarter. Other kinds of application might use different parameters to define the reports that are available to the users.

Following step 304, control proceeds to each of steps 305 and 307, which, as described below, create the queries necessary to obtain the data to be included in report display 100. Steps 305 and 307 may be executed in parallel, and are generally executed asynchronously, even if they are sometimes executed simultaneously. In other words, as described in more detail below with respect to FIG. 7, it is advantageously possible to submit, and receive results from, an image query 218 without having to also submit a feature query 220. This is because features 102 and image 104 are advantageously stored in separate data structures, i.e., as distinct data objects, in client 202, and are never combined. Thus, it should be apparent that the information within report display 100 may be more flexibly and efficiently manipulated and refreshed. For example, a user requesting a report showing sales for a set of states could have sales data contained in a first data structure, representing vector graphics data, overlaid with data contained in a second data structure, representing image data in bitmap format, displayed in report display 100. If the user then wished to see expense data for the same set of states, it would only be necessary to refresh the first data structure. Similarly, if the user wished to view sales data for a second set of states, it advantageously may be necessary to refresh only the second data structure. Further, it should be apparent that feature set 102 and image 104 may advantageously be obtained from entirely different databases and/or servers with entirely different formats, application software, locations, query interfaces, etc.

In step 305, feature query 220 is created. In one embodiment, feature query 220 is actually broken down into two sub-queries, although embodiments are possible in which only one query, or alternatively multiple sub-queries other than those described herein, are used as feature query 220. The first sub-query, referred to as "getFeatureInfo," consists of a query for report data 214 in reporting database 210 responsive to request 203. Those skilled in the art will understand that such data is commonly stored in tables in a relational database, and may easily be accessed by a query formulated in Structured Query Language (SQL). Accordingly, in many embodiments, client 202 simply uses the parameters included in request 203 and identified in step 304 to formulate a SQL query such as will be understood by those skilled in the art. However, it should be understood that embodiments are possible in which reporting database 210 is not a relational database, and accordingly feature query 220, or at least one sub-query of feature query 220, is formulated other than according to SQL. It is also possible that query 220 includes report parameters and that the specific request provided to reporting database 210 is formulated by feature server 205.

The second sub-query of feature query 220 created in the above-mentioned embodiment is referred to simply as "getFeatures," and comprises a query for data relating to the presentation and functionality of features 102. For example, such data may be provided by a file or files containing rules for data presentation and functionality. For example, FIG. 5 shows a snippet from a file called styles.xml that is stored on feature server 205 according to one embodiment. Further, FIG. 6 shows a snippet from a file called application.xml that is stored on feature server 205 according to one embodiment. Styles.xml contains what are called style rules, i.e., rules for the presentation and formatting of features. Similarly, application.xml contains what are called event rules, i.e., rules for the functionality that will be associated with a feature when it is displayed on client 202 in a report display 100. Accordingly, in the afore-mentioned exemplary embodiment, some or all of the content of styles.xml and application.xml is incorporated into feature descriptions 225 in feature set 224.

In step 307, image query 218 is created. As explained above with respect to step 305, feature query 220 is created to request report data 214 according to parameters included in request 203. In a similar fashion, image query 218 is created to request image data 212 according to parameters included in request 203. Parameters in request 203 can define responsive image data 212 in a variety of different ways. In general, parameters in request 203 are used to define a bounding box 106, i.e., the boundaries of the image 104 responsive to request 203. Accordingly, it is possible to formulate a query for image data 212 that is responsive to request 203.

For example, as noted above, in most business intelligence applications, request 203 will include a parameter defining a geographic area of interest (e.g., the state of Michigan, the City of New York, the southwestern United States, etc.). Accordingly, the image data 212 of interest with respect to the requested report data 214 will be map data. Therefore, image query 218 is formulated to request a map image of the geographic area relevant to the requested report data 214. The precise format of image query 218 depends on the requirements of the specific image server or servers 208 being used in the system 200. For example, in embodiments in which image server 208 is the Mappoint Web Service mentioned above, image query 218 will be formulated according to the requirements of the Mappoint Web Service and submitted via HTTP.

Following step 305, control proceeds to step 306. In step 306, feature query 220 is submitted to feature server 205.

Following step 307, control proceeds to step 308. In step 308, image query 218 is submitted to feature server 205. Feature query 220 and image query 218 are generally submitted to feature server 205 via HTTP, although those skilled in the art will recognize that other protocols and/or methods could be used for submission of feature query 220 and image query 218.

In steps 310 and 312, feature server 205 brokers feature query 220 and image query 218 respectively. In this instance, brokering a query 218 or 220 means simply that feature server 205 receives the query 218 or 220 from client 202 and determines the address (e.g., a link to a database, or a network address such as an IP address, etc.) to which the query 218 or 220 should be submitted, and accordingly submits the query 218 or 220 to the determined address.

In step 314, reporting database 210, having received feature query 220 from feature server 205, returns a set of report data 214 to feature server 205. In many embodiments, as mentioned above, reporting database 210 executes an SQL query to retrieve the set of report data 214 to be returned to feature server 205. Report data 214 may be returned to feature server 205 using any one of a number of means known to those skilled in the art, including transfer of ASCII data, data formatted according to an eXtensible Markup Language (XML) standard, a binary data stream etc. Control then proceeds to step 318.

In step 316, image server 208, having received image query 218 from feature server 205, returns a set of image data 212 to feature server 205. Image server 208 generally identifies the set of image data 212 to be returned to feature server 205 according to a bounding box 106, i.e., the boundaries of the set of image data associated with the user's request 203 for a report. For example, in the business intelligence context, the bounding box will typically identify the area of a geographic map to be displayed as part of presenting a report. Accordingly, image server 208 will return image data 212 showing a map representing the geographic area defined by the bounding box. In other embodiments, image data 212 may comprise a chart or graph, such as a graph of some statistical measure in an XY plane such as is known to those skilled in the art. In other embodiments image data 212 may comprise yet other kinds of data. Image data 212 may be returned in any one of a number of bitmap formats known to those skilled in the art, including JPEG, GIF, PNG, etc. Following step 316, control proceeds to step 328.

In step 318, feature server 205 receives report data 214 from reporting database 210 and determines whether the received report data 214 is what is referred to as "image referenced." Report data 214 contains image references if it includes some way to associate each record in the set of report data 214 with a particular point in a set of image data 212. For example, if image 104 is the representation of a map, each record in report data 214 may include geographic references such as longitude and latitude that provide a precise geographic location with which the record may be associated. Similarly, if image 104 is the representation of a graph of some statistical measure, then a report datum 214 will correspond to a point or points on the graph, and such correspondence may be determinable from the report datum 214.

On the other hand, the returned report data 214 may lack information enabling an association with a precise point in an image 104. For example, records in the returned report data 214 may specify a street address or a zip code, which is helpful information in identifying a geographic location associated with the record, but, as those skilled in the art will recognize, is insufficient to identify a precise geographic location that may be plotted on a map. If the returned report data 214 is not image referenced, control proceeds to step 320. However, if the returned report data 214 is image referenced, control proceeds to step 322.

In step 320, the returned report data 214 is image referenced. That is, information sufficient to identify a precise location in an image 104 is appended to each record of the returned report data 214. The manner of image referencing returned report data 214 will vary for different types of applications. For example, in a business intelligence application in which image 104 will be a map, image referencing may include identifying location information, such as a street address or a zip code, in each record of the returned report data 214 and appending to each record a longitude and latitude determined based on the identified location information.

Where the records in returned report data 214 include information sufficient to associate the record with a specific point in an image 104, the required processing may include no more than looking up an association between the information that is included in the returned report data 214 and the information needed to precisely identify a point in an image 104. For example, a business intelligence application could thus make use of a database, lookup table, etc., associating information such as street addresses with specific latitudes and longitudes.

In many cases records in report data 214 will include information that is only sufficient to identify an area, and perhaps an irregularly shaped area, rather than a point in an image 104. In such cases, in which the records in returned report data 214 do not include information sufficient to associate the record with a specific point in an image 104, a greater amount of processing may be required. For example, in many business intelligence applications, records in report data 214 include a zip code and no other information according to which the record may be associated with a precise geographic location. The area defined by a zip code is often an irregular and many-sided polygon. Those skilled in the art will understand that ways of associating a polygon with precise points on an image are known, but may require greater amounts of processing.

Returning to FIG. 3, in step 322 feature server 205 performs data projection with respect to the report data 214 returned from reporting database 210. The concept of data projection and manners of performing it are well known to those skilled in the art. Once the records in the returned report data 214 have been associated with points within the bounding box of request 203, it is necessary to project exactly where those points will appear on an image 104. For example, assume that image 104 is a rectangular, i.e., two-dimensional, representation of a map, and the information used to identify the location of records in report data 214 is latitude and longitude. Those skilled in the art will recognize that latitude and longitude provide coordinates of reference in three dimensions, and must be projected onto the two-dimensional map representation of image 104.

Following step 322, control proceeds to step 324. In step 324, server 205 creates feature set 224. As discussed above with reference to FIG. 4, feature set 224 includes feature descriptions 225 for features 102. A feature description 225 includes a variety of attributes associated with a feature 102, including style rules, an event model, and data attributes for the feature 102. Each feature description 225 in feature set 224 also includes the location of the features 102 on an image 104. That is, as those skilled in the art will understand, a vector graphics file includes instructions for how to render a geometric shape. Examples of style rules included in a feature description 225 might include, as noted above with reference to FIG. 1, rules for shading various regions of an image different colors based on values of report data 214 (i.e., the data attributes for the feature 102) associated with the various regions. That is, a feature 102 may include data attributes, and in addition may include style rules governing how the feature is displayed depending on the values of one or more data attributes. As mentioned above, other information in feature descriptions 225 may include an event model for the feature 102 (e.g., onmouseover=showballoon, onclick=drilldown, etc.) Following step 324, control proceeds to step 326.

In step 326, feature set 224 is sent to client 202. Following step 326, control proceeds to step 332.

As mentioned above, control proceeds to step 328 following step 316. In step 328, image data 212 received by feature server 205 in step 316 is transformed to meet the requirements of client 202. This transformation could involve changing the size of the image 104, changing other characteristics (e.g., change color to black and white, take the negative of the image, darken lines, etc.), or could involve changing the file type. For example, in one embodiment, the Mappoint server described above returns image data 212 in PNG format, while client 212, which uses the Macromedia Flash software mentioned above, requires images to be displayed to be presented in JPEG format. Accordingly, in this embodiment, a conversion of file type is a necessary image transformation. Other necessary and/or desirable image transformations may be apparent to those skilled in the art. Following step 328, control proceeds to step 330.

In step 330, image 104 is sent to client 202. Following step 330, control proceeds to step 332.

In step 332, client 202 coordinates image 104 and feature set 224. The goal of step 332 is to enable the overlay of features 102 on image 104. This step of coordination may involve several different aspects. As mentioned above with respect to image 104, it is necessary for data displayed by client 202 to be in a format that is acceptable to client 222. Because feature set 224 is most likely in a text file such as an XML file, it is necessary to convert feature set 224 to a format that can be rendered by client 202. For example, in embodiments using Flash technology, feature set 224 is converted to the proprietary Flash format. However, feature set 224 could be viewed as other formats. For example, in embodiments in which feature set 224 is an SVG file, it is possible to view feature set 224 in an SVG viewer such as will be known to those skilled in the art. Further, in step 332 it is necessary to ensure that image 104 and feature set 224 will be rendered as the same size and shape on client 202. Following step 332, control proceeds to step 334.

In step 334, feature set 224 and image 104 are provided together as part of report display 100 on a display of client 202. An example of such a report display 100 is shown in FIG. 1, as discussed above.

Figure 7:
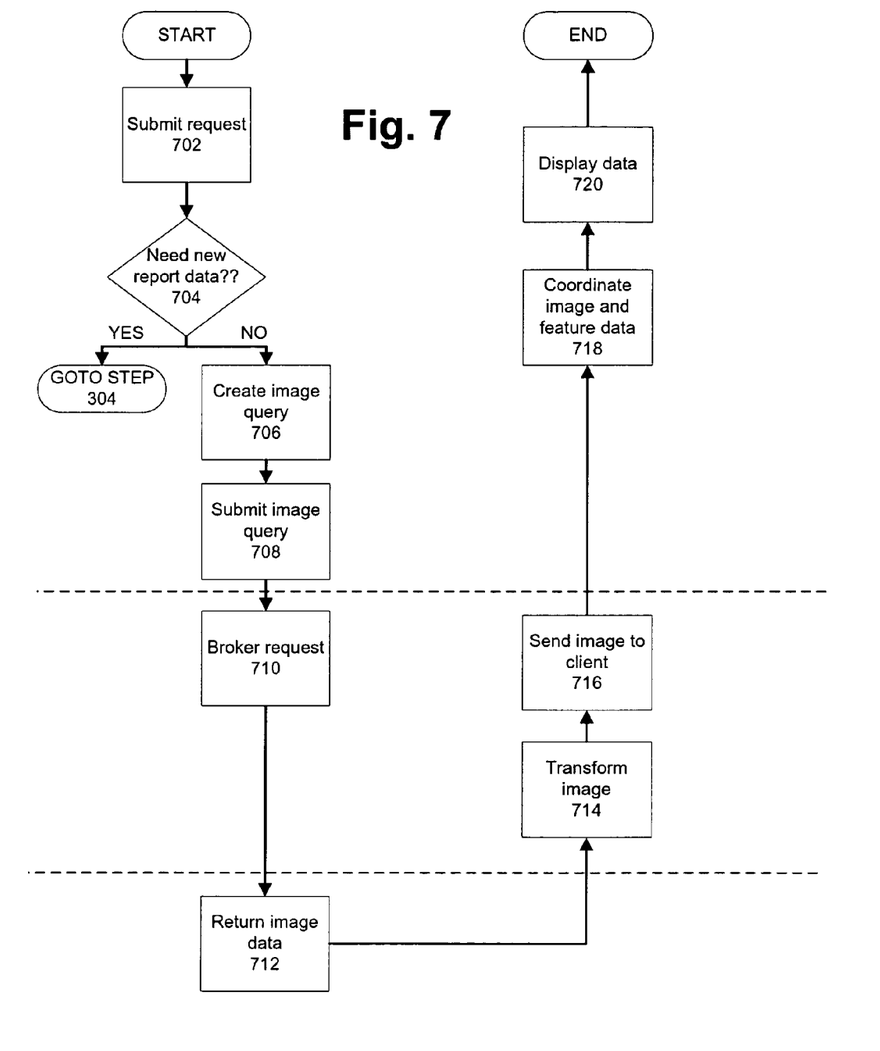
FIG. 7 shows an exemplary process flow for asynchronously refreshing an image, according to an embodiment.

FIG. 7 shows another exemplary process flow for asynchronously refreshing image 104. Advantageously, this process flow does not require the simultaneous refresh of features 102. Further, it should be understood that embodiments are also possible, and practiced, in which features 102 are asynchronously refreshed without a corresponding refresh of image 104.

Execution of step 702 is substantially similar to processing described above with respect to step 302, after which, control proceeds to step 704.

In step 704, it is determined whether the newly submitted request 203 requires a refresh of features 102, i.e., whether the request 203 requires any report data 214 that is not already present on client 202. If yes, processing proceeds as described above with respect to step 304 and the steps described as following therefrom. If no, control proceeds to step 706.

Execution of steps 706 through 716 is substantially similar to processing described above with respect to steps 307, 308, 312, 316, 328, and 330, after which control proceeds to step 718.

Execution of step 718 is substantially similar to processing described above with respect to step 332, although it should be understood that in step 718 a newly returned image 104 is coordinated with features 102 that were previously returned to client 202 and coordinated with a previously returned image 104. Following step 718, control proceeds to step 720.

Execution of step 718 is substantially similar to processing described above with respect to step 334, following which the process described with respect to FIG. 7 ends.

CONCLUSION

In accordance with the provisions of the patent statutes, the principles and modes of operation have been explained and illustrated. However, it should be understood that embodiments described herein may be practiced otherwise than is specifically explained and illustrated without departing from the spirit or scope thereof, and that the invention described herein is intended to be limited only by the following claims.

We claim:

1. A system, comprising:
a computer comprising a memory, the memory storing instructions for maintaining (a) a first data object for storing a first set of feature data in a first format, the feature data including a plurality of features and the first format including human-readable data, and (b) a second data object for storing a first set of image data in a second format, the second format including computer-readable and not human-readable data, wherein, for each feature in the feature data, the feature data includes an identification of at least one point where the feature is to be overlaid on the image data, said instructions further including instructions to:
  include, in a graphical user interface, a display based on at least some of the first set of feature data overlaid on at least some of the first set of image data according at least in part to the identification of the at least one point where each feature is to be overlaid on the image data;
  send at least one query;
  receive, in response to the at least one query, a second set of data that includes one and only one of (a) a second set of feature data in the first format and not image data in the second format or (b) a second set of image data in the second format and not feature data in the first format, whereby the second set of data includes data for replacing one and only one of (a) at least a portion of the first set of feature data and not any of the first set of image data or (b) at least a portion of the first set of image data and not any of the first set of feature data; and
  modify the display based on at least some of the second set of data without modifying any portion of the display based on data not replaced in the second set of data.

2. The system of claim 1, wherein the first format is a vector format and the second format is a bitmap format, the vector format providing for vector data to draw a geometric object and at least one of an event model, a style rule, and a data attribute.

3. The system of claim 2, wherein the bitmap format is one of JPEG, PNG, and GIF.

4. The system of claim 1, the computer further configured to:
   refresh the first data object if the second set of data includes the feature data; and
   refresh the second data object if the second set of data includes the image data.

5. The system of claim 1, further comprising a server, said server configured to:
   obtain at least one of the feature data and the image data upon receiving the at least one query; and
   send the image data and the feature data to the computer.

6. The system of claim 1, further comprising a database for providing at least some of the feature data.

7. The system of claim 1, further comprising a database for providing at least some of the image data.

8. The system of claim 1, further comprising a first database for providing at least some of the feature data and a second database for providing at least some of the image data.

9. The system of claim 1, wherein the feature data includes at least one of a style rule, an event rule, and a report datum.

10. The system of claim 1, wherein the image data comprises a representation of at least one of a geographic map and a two-dimensional coordinate system.

11. The system of claim 1, the computer further comprising a network connection, wherein at least one of the feature data and the image data are received via a network.

12. A method, comprising:
   receiving a first set of feature data, including human-readable data, from a remote device, the feature data including a plurality of features, wherein, for each feature in the feature data, the feature data includes an identification of a point or points where the feature is to be overlaid on the image data, said instructions further including instructions;
   receiving a first set of image data, including data that is computer-readable but not human-readable, from the remote device;
   including, in a graphical user interface, a display based on at least some of the first set of feature data overlaid on at least some of the first set of image data according at least in part to the identification of the point or points where each feature is to be overlaid on the image data;
   sending a request to the remote device to update one, and not both, of the image data and the feature data;
   receiving, responsive to the request, an updated set of data that includes one and only one of (a) a second set of feature data in the first format and not image data in the second format or (b) a second set of image data in the second format and not feature data in the first format, whereby one of the first set of feature data and the first set of image data is updated in response to the request and one of the first set of feature data and the first set of image data is not updated in response to the request; and
   modifying the display based on at least some of the updated set of data without modifying any portion of the display based on data not replaced in the second set of data.

13. The method of claim 12, wherein the feature data is in a vector format and the image data is in a bitmap format, the vector format providing for vector data to draw a geometric object and at least one of an event model a style rule, and a data attribute.

14. The method of claim 13, wherein the bitmap format is one of JPEG, PNG, and GIF.

15. The method of claim 13, wherein the vector format is according to extensible markup language (XML).

16. The method of claim 12, further comprising:
   sending a second request;
   receiving one of a second set of feature data and a second set of image data in response to the second request; and
   updating the display with the second set of feature data or the second set of image data in the second format.

17. The method of claim 12, wherein the feature data includes at least one of a style rule, an event rule, and a report datum.

18. The method of claim 12, wherein the image data comprises a representation of at least one of a geographic map and a two-dimensional coordinate system.

19. The method of claim 12, wherein the at least one query includes a first sub-query for the feature data and a second sub-query for the image data.

20. The method of claim 12, wherein the feature data includes at least one feature having an identifier identifying the feature and feature attributes associated with the feature that include report data.

21. The method of claim 20, the feature also including at least one of styles associated with the feature and events associated with the feature.

22. The method of claim 12, wherein the first set of image data is provided in a single image file.

23. A computer-readable medium tangibly embodying computer-readable code comprising instructions executable by a processor, the instructions comprising instructions for:
   receiving a first set of feature data, including human-readable data, from a remote device, the feature data including a plurality of features, wherein, for each feature in the feature data, the feature data includes an identification of a point or points where the feature is to be overlaid on the image data, said instructions further including instructions;
   including, in a graphical user interface, a display based on at least some of the first set of feature data overlaid on at least some of the first set of image data according at least in part to the identification of the point or points where each feature is to be overlaid on the image data;
   sending a request to the remote device to update one, and not both, of the image data and the feature data;
   receiving, responsive to the request, an updated set of data that includes one and only one of (a) a second set of feature data in the first format and not image data in the second format or (b) a second set of image data in the second format and not feature data in the first format, whereby one of the first set of feature data and the first set of image data is updated in response to the request and one of the first set of feature data and the first set of image data is not updated in response to the request; and
   modifying the display based on at least some of the updated set of data without modifying any portion of the display based on data not replaced in the second set of data.

24. The computer-readable medium of claim 23, wherein the feature data is in a vector format and the image data is in a bitmap format, the vector format providing for vector data to draw a geometric object and at least one of an event model, a style rule, and a data attribute.

25. The computer-readable medium of claim 24, wherein the bitmap format is one of JPEG, PNG, and GIF.

26. The computer-readable medium of claim 23, wherein the feature data includes at least one of a style rule, an event rule, and a report datum.

27. The computer-readable medium of claim 23, wherein the image data comprises a representation of at least one of a geographic map, and a two-dimensional coordinate system.

* * * * *

UNITED STATES PATENT AND TRADEMARK OFFICE
CERTIFICATE OF CORRECTION

PATENT NO. : 7,567,262 B1
APPLICATION NO. : 11/068442
DATED : July 28, 2009
INVENTOR(S) : Ian Clemens et al.

It is certified that error appears in the above-identified patent and that said Letters Patent is hereby corrected as shown below:

In Claim 13, Column 13, line 62, please place a --,-- after "model" and before "a style" so as to read: "an event model, a style rule,"

Signed and Sealed this

First Day of September, 2009

David J. Kappos
*Director of the United States Patent and Trademark Office*